US008131830B2

(12) United States Patent
Gill et al.

(10) Patent No.: US 8,131,830 B2
(45) Date of Patent: Mar. 6, 2012

(54) SYSTEM AND METHOD FOR PROVIDING SUPPORT SERVICES USING ADMINISTRATIVE RIGHTS ON A CLIENT COMPUTER

(75) Inventors: Rajpal S. Gill, Rocklin, CA (US); Thomas M. Tripp, El Dorado Hills, CA (US); James L. Barkley, Rocklin, CA (US); Karamadai Srininvasan, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1609 days.

(21) Appl. No.: 10/828,078

(22) Filed: Apr. 19, 2004

(65) Prior Publication Data
US 2005/0234824 A1 Oct. 20, 2005

(51) Int. Cl.
*H04L 9/00* (2006.01)
(52) U.S. Cl. .................................. 709/223; 726/3; 726/5
(58) Field of Classification Search .................. 713/150, 713/155, 182–186, 188–189; 726/1–8, 17–19, 726/12, 26–31; 709/203, 229, 223–225
See application file for complete search history.

(56) References Cited

U.S. PATENT DOCUMENTS

| | | | | |
|---|---|---|---|---|
| 5,983,270 A * | 11/1999 | Abraham et al. | ............... | 709/224 |
| 6,135,646 A * | 10/2000 | Kahn et al. | ..................... | 709/217 |
| 6,467,080 B1 * | 10/2002 | Devine et al. | ................. | 717/123 |
| 6,611,872 B1 * | 8/2003 | McCanne | ...................... | 709/238 |
| 6,757,710 B2 * | 6/2004 | Reed | ............................... | 709/203 |
| 6,788,688 B2 * | 9/2004 | Trebes, Jr. | .................. | 370/395.1 |
| 6,829,639 B1 * | 12/2004 | Lawson et al. | ................. | 709/224 |
| 6,938,021 B2 * | 8/2005 | Shear et al. | ..................... | 705/67 |
| 7,010,600 B1 * | 3/2006 | Prasad et al. | ................... | 709/225 |
| 7,031,957 B2 * | 4/2006 | Harris | ................................. | 707/3 |
| 7,054,868 B2 * | 5/2006 | Roemke et al. | ................. | 707/10 |
| 7,072,807 B2 * | 7/2006 | Brown et al. | ...................... | 703/1 |
| 7,103,656 B2 * | 9/2006 | Lewis et al. | ................... | 709/223 |
| 7,191,438 B2 * | 3/2007 | Bryant | ........................... | 717/176 |
| 7,240,325 B2 * | 7/2007 | Keller | ............................ | 717/104 |
| 7,290,258 B2 * | 10/2007 | Steeb et al. | ..................... | 717/178 |
| 7,322,048 B2 * | 1/2008 | Nortung | ........................... | 726/34 |
| 7,366,768 B2 * | 4/2008 | Deo et al. | ....................... | 709/217 |

OTHER PUBLICATIONS

"LANDesk Instant Support Suite Pro the fast and easy way to support customers securely via the internet", LANDesk Software, www.landesk.com.
"GoTo Assist Like being there.", expertcity, Expertcity, Inc., 5385 Hollister Avenue, Santa Barbara, CA 93111, 222.GoToAssist.com, 2003.

* cited by examiner

*Primary Examiner* — Kim Vu
*Assistant Examiner* — Leynna Truvan (57) ABSTRACT

A method is provided for enabling a support program to provide services using imported administrative rights on a client computer for a user without administrative rights. The method includes the operation of creating a global administrative account on a domain server for a computer network. In addition, the support program can be activated on the client computer. A further operation is creating a process with administrative rights from the support program using the global administrator account on the domain server. The support services enabled with administrative rights can then to be provided for the client computer using the process created with administrative rights.

30 Claims, 3 Drawing Sheets

SYSTEM AND METHOD FOR PROVIDING SUPPORT SERVICES USING ADMINISTRATIVE RIGHTS ON A CLIENT COMPUTER

FIELD OF THE INVENTION

The present invention relates generally to providing support services for a client computer.

BACKGROUND

As the technology environment becomes more closely aligned with business strategies, optimizing information technology (IT) infrastructure investments and improving overall system availability and utilization become increasingly central to marketplace success. Today more than ever before, it is critical to reduce the cost and complexity and to improve the efficiency and effectiveness of data centers, servers, desktops, and other key computing infrastructure.

In today's highly diverse multi-vendor computer environments, reducing the complexity of managing information technology (IT) is critical for achieving cost-efficiency and productivity. System administrators need to identify and resolve problems quickly. Preventing problems from spreading throughout a computing environment is also important. Diagnosing root problem causes accurately and resolving emerging issues is vital to IT managers before the problems impact strategic business operations. In addition, system administrators need to do all of this with a constantly shrinking budget and workforce.

Support applications have been developed to address these urgent issues with remote troubleshooting and problem resolution capabilities for multi-platform, multi-operating system environments that are located anywhere in an organization from the desktop to the datacenter. For example, some software tool suites offer easy-to-use Web-based capabilities that address the support needs of both business and IT professionals for the data center, desktops, and the distributed computing environment.

For example, these support applications can provide proactive remote monitoring, diagnostics, and troubleshooting to help system administrators enhance the availability of Windows®, HP-UX®, and Linux servers, desktops, and storage devices. Additionally, these support products can help minimize costly downtime through automated diagnosis and remote support for desktop, mobile computing, printing, and tape storage problems.

In contrast to enterprise computing problems, end-users do not care about fast-evolving technologies. They do not understand that there are limited support resources and pressures to cut the total cost of ownership (TCO) for desktop computers. The end users simply want their computing devices to work. Some end users are even willing to fix easily addressed issues themselves, as long as they can rely on the system administrators to resolve the more complex problems.

Support applications can reduce the load on system administrators and IT staff by providing advanced capabilities that let end-users efficiently identify and address diverse desktop computer and printing problems on their own. Reporting systems can be included to provide seamless escalation to a corporate help desk in order to streamline the resolution of particularly complex issues.

Most support organizations do not operate this way because they lack intuitive end-user tools that are linked to help desk capabilities. Web-enabled support software fills this void by providing and connecting end-users and help desk solutions in multi-vendor environments.

One reason why such web-enabled support solutions are not widely used by organizations is because they can be difficult to deploy. Installing web-enabled support tools onto remote computers is a problem because businesses and corporations frequently disable administrative rights on end user desktop computers or datacenter servers in order to prevent unwanted applications from being launched on the computer from the Internet. For example, the downloading and launching of ActiveX controls, Java programs, and similar applications from the Internet are often disabled for security reasons. This type of policy helps protect computer networks against viruses, zombie applications, adware, spyware, and other threats. The drawback of this policy is that these restrictions also prevent end users from launching valuable web support applications from an Internet site. As a result, web services such as diagnostics, data harvesting, pre-scripted solutions, or similar applications cannot be delivered to an end user or remote server when such security restrictions are in place.

SUMMARY OF THE INVENTION

A system and method are provided for enabling a support program to provide services using administrative rights on a client computer for a user without administrative rights. The method includes the operation of creating a global administrative account on a domain server for a computer network. In addition, the support program can be activated on the client computer. A further operation is creating a process with administrative rights from the support program using the global administrator account on the domain server. The support services enabled with administrative rights can then be provided for the client computer using the process created with administrative rights.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention is a system and method for enabling a support program to provide services using administrative rights on a client computer. Particularly, the present invention is valuable in the situation where a user or remote computer does not have administrative rights because the network administrator has disabled those rights. The reason why a user may not have administrative rights is to reduce the possibility that rogue programs, viruses, spyware, adware, or unfriendly web objects will be downloaded from the Internet into the protected local network.

Figure 1:
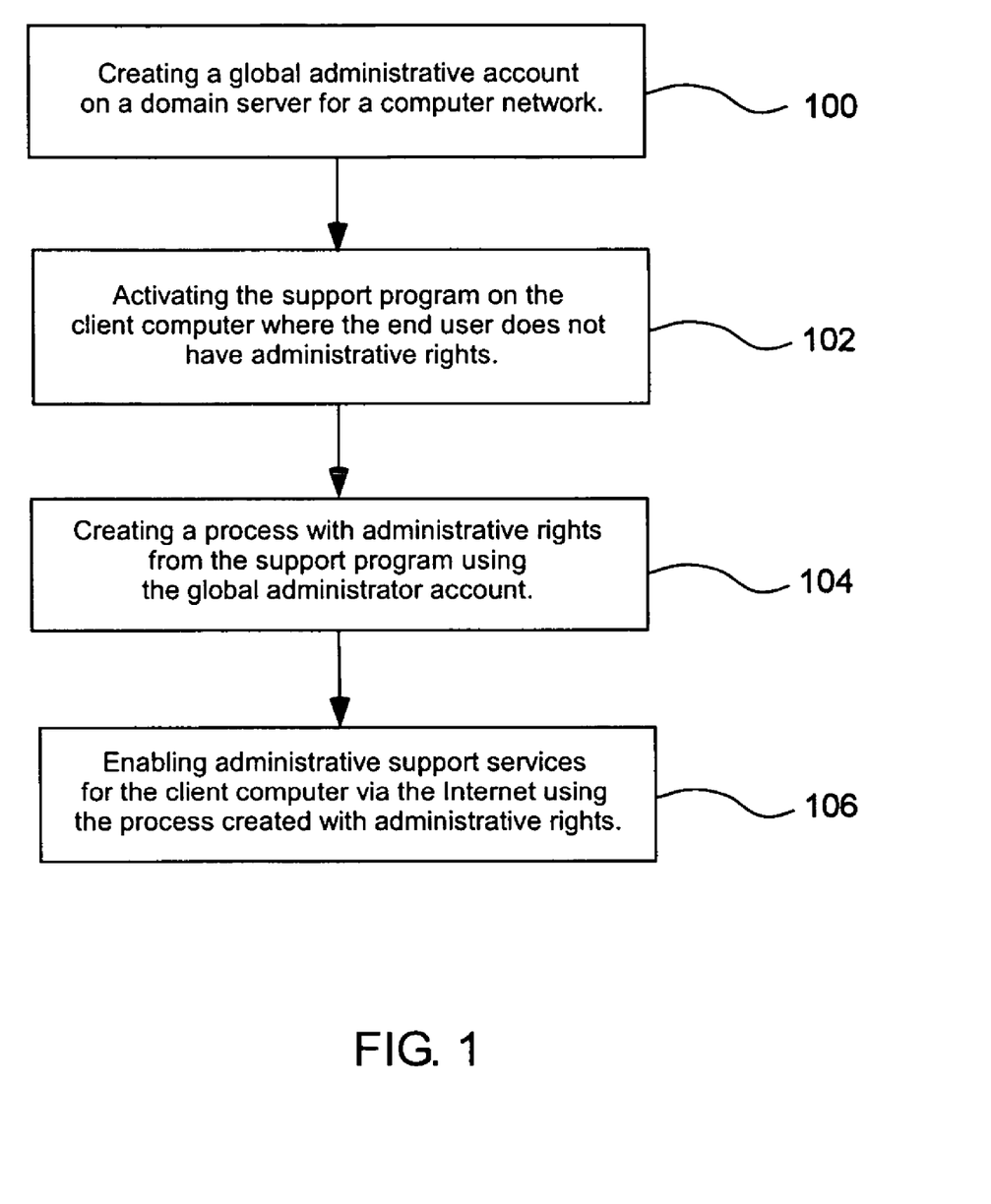
FIG. 1 is a flow chart illustrating an overview of a method for enabling a support program to provide services using administrative rights on a client computer in accordance with an embodiment of the present invention.

FIG. 1 illustrates an overview of operations in the method for enabling the support program to provide services. The method includes the operation of creating a global administrative account on a domain server for a computer network as in block 100. A domain is generally defined as a logical grouping of servers and/or computers that share common security and user account information. This domain information is stored in a master directory database that resides on a server designated as a domain server or domain controller. In the case of a Microsoft® Windows server, a domain database may be stored on the domain server using Active Directory®, which is a distributed database sent out via a modified Domain Name System (DNS) server. Accessing the global administrative account can supply administrative rights to a program or user that is able to authenticate or login to the global administrative account located on the domain server.

A further operation in the method is activating the support program on the client computer as in block 102. When the support program is initially loaded, it will not generally have administrative rights. The support program may have already been installed on the client computer, downloaded from an Internet website, or downloaded from another computer located inside or outside of the protected local network. Once a support program has been activated, the support program can create a process with administrative rights as in block 104. One way the process can obtain the administrative rights is by authenticating through the global administrative account on the domain server. In one embodiment of the invention, the support program may have the authentication information to access the global administrator account locally pre-loaded. For example, the support program may have encrypted (or unencrypted) key or login information hard-coded into the support program or stored in a configuration file (e.g., .INI file). Alternatively, the information to access the global administrator account may be loaded from another remote computer or server which will be discussed in more detail later.

Once a process has been created with administrative privileges or rights, this enables support services to be provided for the client computer at an administrative level. In other words, administrative actions can then be performed by the process, such as program installation and the creating, deleting, modifying, moving, or setting of permissions on objects in the file system and operating system.

A further operation in the method is enabling the administrative support services for the client computer using the process created with administrative rights as in block 106. The support services provided can be locally pre-installed services that use administrative rights or the services can be downloaded and installed from the Internet. For example, the process can execute services such as advanced information recovery services, hardware diagnostics, data harvesting, application installation, driver updates, and pre-scripted solutions. Part or all of these support services may be downloaded from the Internet and then applied on the client computer.

One example of a valuable support service is supplying hardware diagnostics. A user may be on the telephone or in electronic communication (e.g., using an interactive web page) with a help desk that is geographically remote from the client computer or server. Then the help desk personnel are able to activate the support program or have the user activate the support program, which enables the most current hardware diagnostics to be downloaded from the Internet. These hardware diagnostics can then be executed on the computer in order to identify any hardware problems for the computer.

Figure 2:
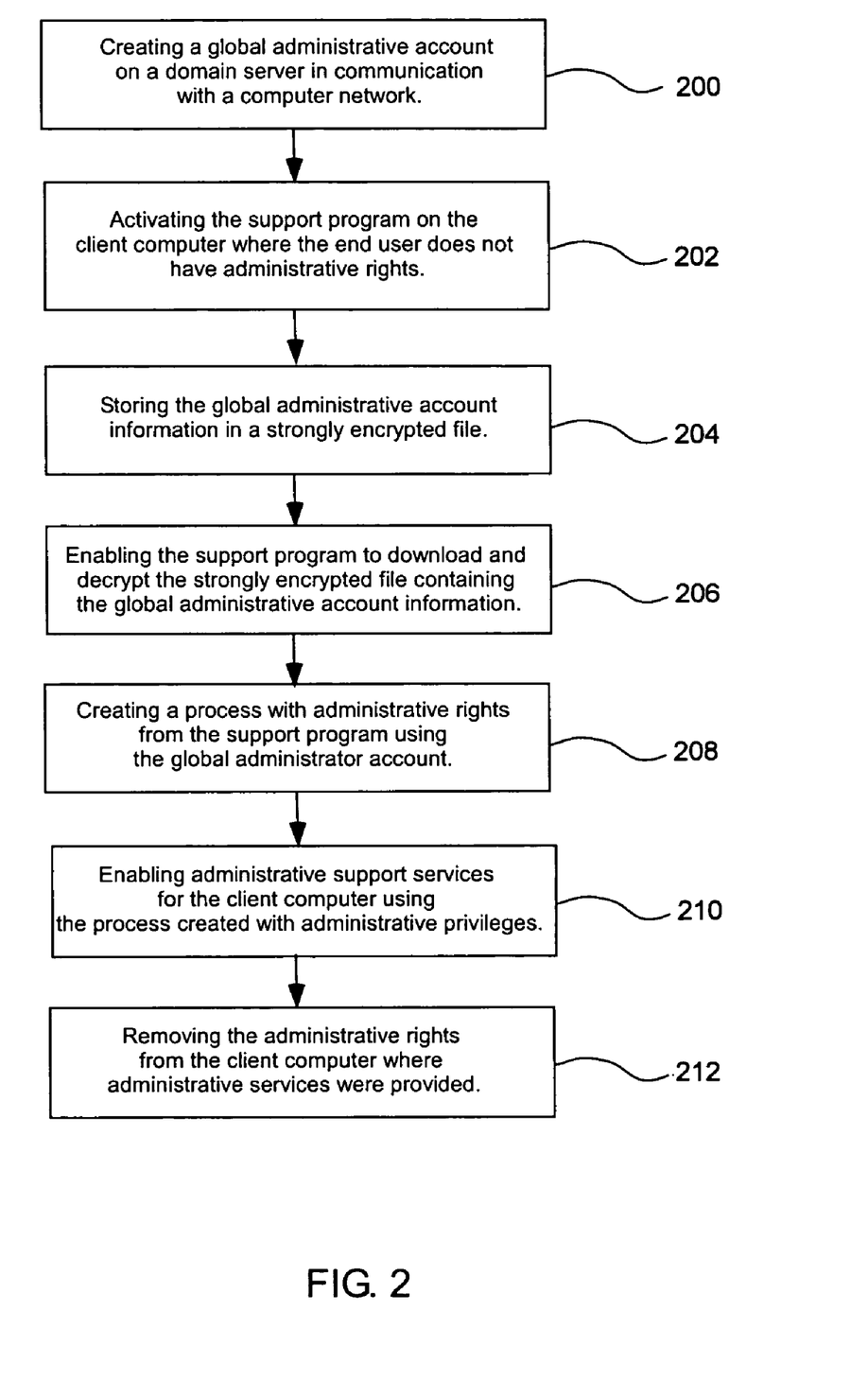
FIG. 2 is a flow chart illustrating more detailed operations for a method for enabling a support program to provide services using administrative rights on a client computer in accordance with an embodiment of the present invention.

Now that one embodiment of the present invention has been described, another more detailed embodiment of the invention will be discussed. FIG. 2 illustrates a method for enabling a support program to provide administrative services on a client computer. As discussed before, the end user on the client computer will not generally have administrative rights but will typically have just end user rights. In order for a support program to be able to download and apply additional administrative services from the Internet or from an outside network, administrative rights can be obtained by the support program or its child programs. Moreover, there may be other installation needs or client computer modifications that need to be performed that require the use of administrative level rights.

In order to setup the administrative rights needed for the support program, a global administrative account is created on a domain server that is in communication with the computer network as in block 200. The domain server can contain a master rights database for the entire local or wide area network. However, it should be realized that a different server might be used to store the global administrative account as long as that server can distribute the global administrative rights for the network.

The support program may then be activated on the client computer and the client computer will generally have an end user that does not have administrative rights as in block 202. Another operation in the present method is storing the global administrative account access information in a strongly encrypted file as in block 204. Alternatively, the global administrative account information can be stored in an encrypted account information file. The level or type of encryption actually used is not as important as the fact that a level of protection is provided against users who are not authorized to access the account information file. Providing robust security for the account information file helps ensure the data integrity and transaction security for the support software. Industry-standard encryption and authentication technology can be used to reduce the cost of developing the security for the support software. This encrypted account information file may be stored on a hypertext transfer protocol (HTTP) enabled server. This allows the encrypted account information file to be accessible using widely available protocols. Accordingly, 128-bit secure sockets layer (SSL) encryption, some other symmetric key, or public key encryption can be used.

The value of storing the global administrative account access information in a separate centrally-located file is that each of the support programs does not need detailed account login or key information stored on the client with the support program. In fact, storing the global administrative account access information on the client computer can present a security hazard because the file is then physically accessible to end-users and more vulnerable. Using a centralized file also means that each separate copy of the support program can be configured to access that centralized file to download the administrative account access information. The information included in the global administrative account access information file can be a login and password, an authentication key, or data that can be sent to the domain server to obtain administrative rights. In a sense, this structure allows the support program to temporarily import administrative rights for specific tasks and the remove those administrative rights when the tasks are completed.

Since this global administrative account information is preferably located in a centralized location, the strongly encrypted file can be located on a separate server, the domain server itself, another client, or some other computer within the local network. The support program is enabled to download and decrypt the strongly encrypted file as in block 206. The result is that the administrative account authentication information does not pass over the Internet or some other unsecured network connection.

Once the support program has obtained the administrative account information, then the support program can create a process with administrative rights as in block 208. The process can inherit these administrative rights from the support program. A further operation in the present method is enabling administrative support services to be provided for the client computer via the Internet using the process created with administrative rights as in block 210. For example, the process created can enable the downloading of an ActiveX component or Java programs which perform the administrative services or diagnostic services. Alternatively, the process itself may be an ActiveX component or a similar object. In many network environments, especially those of large corporations, the end users do not have administrative rights because the network must be protected against viruses and other problem programs that may be loaded from the Internet. Just accessing a web page and answering an install question incorrectly can sometimes load spyware or viruses.

Once the administrative support services have been completed, then the process with the administrative rights can be removed from the client computer where the administrative services were provided as in block 212. For example, one embodiment of the process that is created by the support program can be a web browser window. This web browser window may be functionality limited to avoid unauthorized uses of the administrative rights associated with the web browser. Functionality that is limited for the web browser can include removing the universal resource locator (URL) text entry box, removing the back and stop buttons, or limiting the types of web sites that can be accessed. Thus, this window or process can be opened by the support tool to load the ActiveX processes and other diagnostic tools from the Internet.

Once the process or browser window has completed its task, it will be terminated and the administrative rights will be relinquished. In other words, no administrative rights will remain on the client computer. Performing the installation and support services in this fashion helps prevent a user from using the Internet browser process or some other support process that is granted administrative rights to load or download programs onto the client computer without the system administrator's knowledge. As discussed previously, these services can be downloaded using the World Wide Web, file transfer protocol (FTP), or other network services that are available across the Internet.

The system and method for the support program of the present invention provides the best of two worlds. This invention limits possible security incursions for the local network while allowing the local network administrators to control the security details for their local or wide area network. In addition, the present invention allows the support program to download support service software from a predetermined internet support application server or from another trusted website that has been appropriately configured. This download feature provides easily updateable and widely distributable services to a well-protected network.

Another benefit of the present invention is that web-enabled support software helps the system administrators to save money. Businesses can save money as a result of reducing the total cost of ownership (TCO) for computer systems by speeding up problem resolution for both users and corporate help desks. Because the support software can be deployed immediately and quickly there is an immediate return on investment. The software results can also be immediately measured in reduced visits to the end-users computers. In addition, no modifications are made to the end-user computer or target computer on which the support solution is executed.

As a result of the powerful support solutions of the present invention, many issues that used to require on-site support can now be resolved remotely. The present invention provides streamlined, unified approach to monitoring and supporting all of the client computers and servers within the network. Instead of using different technology for each type of operating system and hardware platform, a diverse IT environment can be monitored and managed with a single web based support solution. Using one type of support program technology for many platforms results in reduced complexity and eliminates the need to manage multiple remote support tools across an IT environment.

A further valuable aspect of the present invention is that it reduces end-user work disruptions and installation problems because no pre-installation procedures are required. Most if not all of the support software activities can take place in the background, which allows users' devices to continue to operate during problem resolution.

Figure 3:
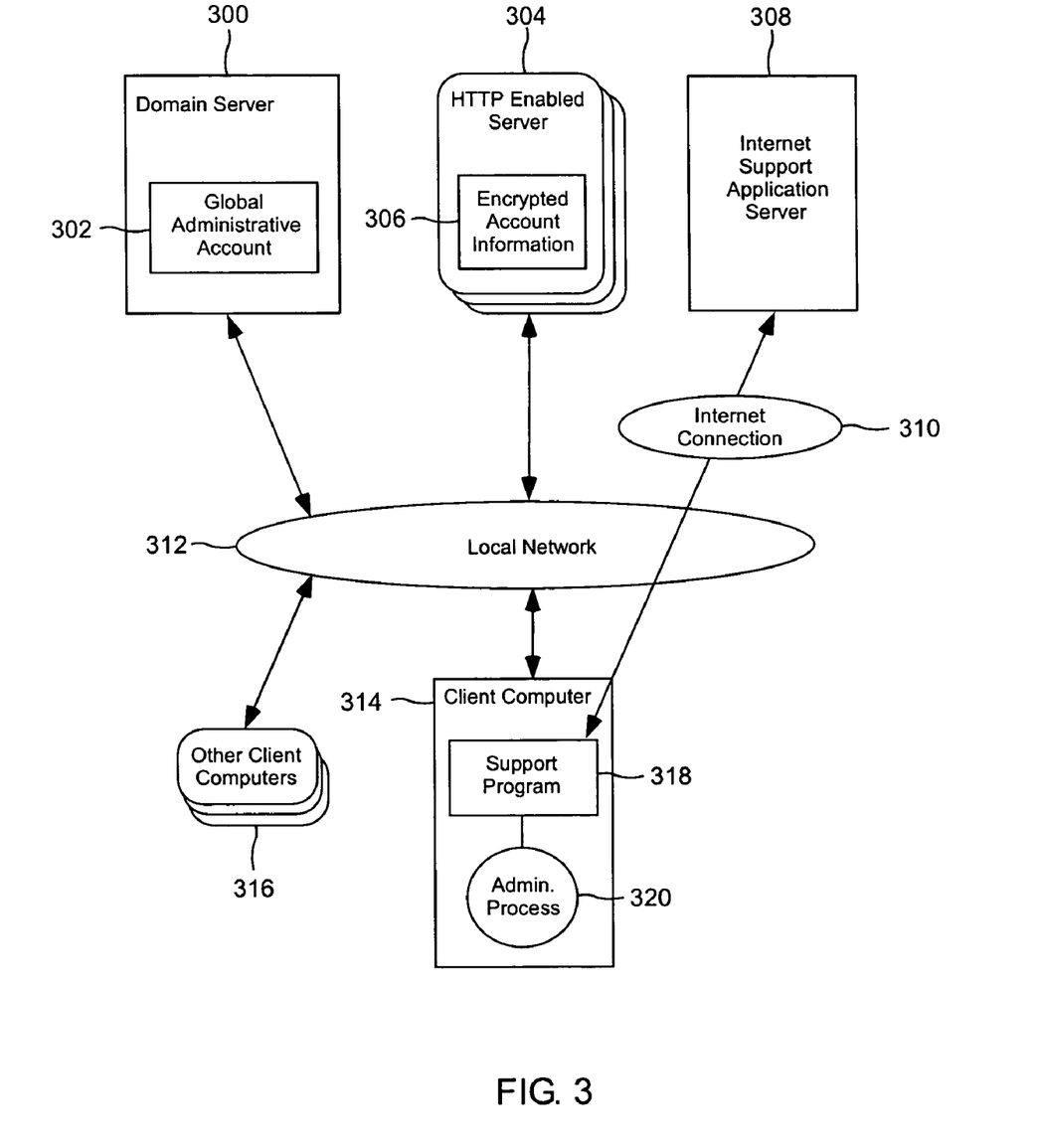
FIG. 3 is a block diagram illustrating a support program to provide services that use administrative rights on a client computer.

FIG. 3 is a block diagram illustrating a system for enabling a support program to provide support services that can use administrative rights on a client computer. The support program is enabled to obtain administrative rights while the end user of the client computer remains limited to end user privileges. The system includes a domain server 300 in communication with a local computer network 312. A global administrative account 302 can be configured to reside on the domain server or another server that stores network and user rights. A support program 318 can be configured to initiate and direct administrative services for a client computer 314. As described previously, the support program can be remotely activated by support desk personnel through the local network or directly launched by the user on the client computer. In addition, the support program 318 may be installed on the client computer from the Internet over an internet connection 310 or loaded from the local network or local storage device (e.g., a local optical drive).

An administrative process 320 can be created or spawned by the support program 318 using rights obtained from the global administrative account 302. The administrative process can be configured to provide administrative support services. However, since the administrative process does not have administrative rights on the user computer it can obtain these administrative rights by logging into the global administrative account.

In FIG. 3, the administrative process does not initially have the authentication information to access the global administrative account. In order to provide flexibility and centralized control, the login or key information for the global administrative account is stored in an encrypted account information file 306, which resides on a separate HTTP Enabled Server 304. This allows the support program to request the encrypted account information via a straightforward HTTP call. Other file transfer protocols can be used in addition to HTTP such as File Transfer Protocol (FTP). Once the encrypted account access information has been downloaded, the information can be decrypted by the support program and then used to obtain the administrative rights.

One benefit of the present invention is that all the account information can be stored in a centralized location. If the network administrators need to make a change in the global administrative account, the changes can be made in one place. Making a change to the encrypted account information, avoids making changes for every single client appearing on the network.

The support program 318 can access a configuration file (not shown) to determine where the encrypted account information is located. For example, in the Microsoft® Windows environment, an .INI configuration file can be used to identify the location for the encrypted account information. This location configuration information may include the file location, file name, file address, port number, or related information for downloading the encrypted account information file.

The administrative processes that are downloaded can use administrative rights to allow their child processes or other loaded modules to be able to perform the requested services on the client computer. For example, the support service may be harvesting specific hardware survey information from the client computer. Thus, if the administrative process spawns another process to perform this harvesting process, then administrative rights can be inherited from the original administrative process and passed on to the harvesting child process.

The software support program and administrative process may be downloaded from the internet support application server 308 along with any additional processes or components that are needed to perform supports services and diagnostics. The administrative processes can be downloaded over an internet connection 310 that is protected by a firewall and/or other protection software and hardware. In addition to the individual client computer 314 that is serviced by the support program, there are typically a number of other client computers 316 that are also serviced by a copy of the support tool loaded on each separate client computer.

It was previously discussed that the support program and administrative processes can execute services such as information recovery services, hardware diagnostics, data harvesting, application installation, driver updates, and pre-scripted solutions. In addition, the support program or web-enabled support tools can provide services such as an augmented knowledge database search to let users refine natural-language searches for their specific computing devices and obtain targeted support-oriented knowledge database results. Another service that can be provided by a web-enabled support tool is desktop computer driver and BIOS support. Driver and BIOS support can automatically gather identifying information and deliver downloadable drivers and BIOS updates. This driver support can be performed periodically or through a special electronic request from the help desk.

Printing diagnostics can also be provided by the web-enabled support program to allow end-users to launch simple automated configuration tests and obtain solutions to recognizable problems. This allows the support program to provide desktop or even server hardware and driver software diagnostics. The support program can quickly test all the software drivers on a client computer and then offer automated fixes to the end user from the Internet support application server or another Internet site.

As discussed briefly before, reporting systems can be included in the support program to provide seamless escalation to a corporate help desk in order to streamline resolution of particularly complex issues. This provides a smooth escalation of support problems to the help desk. The administration tools for the web-enabled tools can also organize all of the problem and diagnostic data to immediately help with resolution procedures. In addition, the system administrators can find additional information from end-users via web chat, chat directly with a vendor, launching additional diagnostics remotely, or use built-in capabilities to take control of end-users' desktops. All the relevant information can automatically be passed on, so the system administrators can collaborate efficiently with the escalation support level personnel to resolve the issue.

As discussed previously, the administrative process that is started can be an internet browser such as Microsoft® Internet Explorer or Netscape® Navigator which provides a window with limited functionality. Thus, the administrative process can use much of the internet browser's application programmer interface (API) functions but disable or hide functionality that might allow the user to download unapproved content from the Internet. Limiting the functionality of the administrative process means that it is difficult for users to misuse or abuse the administrative rights granted in the support session and accidentally or intentionally download destructive programs.

The present invention provides the necessary administrative rights to the processes that need those rights and for a limited time. This helps system administrators perform support services but still withhold administrative rights from end users so that the end users cannot change the software images that are loaded on their computer. If the end user were able to modify and significantly change the image on their computer using the administrative rights, this can cause problems for the local computer, the protected network, and even for the network servers.

The remote support solution of the present invention helps system administrators proactively manage and support HP-UX®, Microsoft Windows®, and Linux servers, along with peripherals, mid-range storage devices, and network devices. A uniform remote support solution can support both mission-critical and non-mission critical systems and devices, thus reducing the cost and complexity of supporting IT environments. The present invention also allows system administrators to proactively reduce downtime and streamline problem resolution. Accelerated time-to-resolution results in improved system availability and business productivity.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method for enabling a support program to provide services using administrative rights on a client computer for a user without administrative rights, comprising the steps of:

creating a global administrative account on a domain server for a computer network, wherein the administrative rights of the client computer are managed by the global administrative account;

activating the support program on the client computer;

storing global administrative account access information in a encrypted file;

enabling the support program to download and decrypt the encrypted file;

creating a process with administrative rights via the support program using the global administrator account on the domain server, wherein the process allows a user of the client computer without administrative rights to perform trouble shooting and problem resolution on the client computer;

enabling support services with administrative rights for the user of the client computer without administrative rights using the process, wherein the support services are used by the user of the client computer without administrative rights to perform trouble shooting and problem resolution on the client computer; and removing the process with administrative rights for the user without administrative rights from the client computer where administrative services were provided once the trouble shooting and problem resolution is complete.

2. A method for as in claim 1, further comprising the step of downloading the process with administrative rights from the Internet to provide the support services.

3. A method as in claim 1, further comprising the step of storing global administrative account authentication information in an encrypted account information.

4. A method as in claim 3, further comprising the step of storing the encrypted account information file as a strongly encrypted file on a server.

5. A method as in claim 3, further comprising the step of storing the encrypted account information file on a Hyper-Text Transfer Protocol (HTTP) enabled server.

6. A method as in claim 3, further comprising the step of enabling the support program to download and decrypt the encrypted account information file containing the global administrative account authentication information.

7. A method as in claim 1, further comprising the step of removing the process with the administrative rights from the client computer where the support services were provided.

8. A method as in claim 7, further comprising the step of removing all administrative rights on the client computer.

9. A method as in claim 1, further comprising the step of removing the support program, process, and additional support software.

10. A method as in claim 1, further comprising the step of providing web enabled support services through the support program.

11. A method as in claim 10, wherein the step of providing web enabled support services further comprises the step of providing a user interface to the end-user to execute hardware diagnostics.

12. A method as in claim 10, wherein the step of providing web enabled support services further comprises the step of allowing web enabled support services to be launched from pre-defined sites.

13. A method as in claim 10, wherein the step of providing web enabled support services further comprises the step of allowing web enabled support services to be launched from a trusted internet site.

14. A method as in claim 10, further comprising the step of supplying web enabled support services to execute that are selected from the group consisting of advanced information recovery services, hardware diagnostics, data harvesting, application installation, driver updates and pre-scripted solutions.

15. A method as in claim 1, further comprising the step of hosting the encrypted account information file on a local computer network that is protected from public computer networks.

16. A method as in claim 1, further comprising the step of enabling the support program to be downloaded from a trusted internet site.

17. A method for enabling a support program to provide support services using imported administrative rights on a client computer without administrative rights being granted to an end user on the client computer, comprising the steps of:

creating a global administrative account on a domain server in communication with a computer network, wherein the administrative rights of the client computer are managed by the global administrative account;

activating the support program on the client computer where the end user does not have administrative rights, wherein activating the support program includes activating a support program to perform trouble shooting and problem resolution on the client computer;

storing global administrative account access information in a strongly encrypted file;

enabling the support program to download and decrypt the strongly encrypted file;

creating a process with administrative rights via the support program using the global administrator account that exists on the domain server, wherein the process allows the end user without administrative rights to perform trouble shooting and problem resolution on the client computer;

enabling administrative support services with administrative rights for the end user without administrative rights from the process, wherein administrative support services are provided to the end user without administrative rights to perform troubleshooting and problem resolution on the client computer through the Internet; and removing the process with administrative rights for the end user without administrative rights from the client computer where administrative services were provided once the trouble shooting and problem resolution is complete.

18. A method as in claim 17, further comprising the step of allowing an entity which controls the local network to determine a level of administrative rights granted using the global administrative account.

19. A method as in claim 17, further comprising the step of providing web enabled support services through the support program.

20. A method as in claim 17, further comprising the step of decrypting authentication information for the global administrative account from the strongly encrypted file to enable the process created by the support program to obtain administrative rights.

21. A method as in claim 17, further comprising the step of storing the strongly encrypted file on a Hyper-Text Transfer Protocol (HTTP) enabled server located on a local network.

22. A system for enabling a support program to provide services that use administrative rights on a client computer without administrative rights being granted to an end user of the client computer on a local computer network, comprising:

a domain server in communication with the local computer network;

a global administrative account, including global administrative account access information in a strongly encrypted file, configured to reside on the domain server;

a support program stored on the client computer configured to direct administrative services on the client computer to perform trouble shooting and problem resolution on the client computer, the support program being installed on the client computer from the Internet, the support program enabled to download and decrypt the strongly encrypted file;

an administrative process created by the support program using the global administrative account, wherein the administrative process is configured to provide web enabled support services using administrative rights obtained from the global administrative account to allow an end user, without administrative rights, to perform trouble shooting and problem resolution on the client computer; and wherein the system is configured to remove the process with administrative rights for the end user without administrative rights from the client computer where administrative services were provided once the trouble shooting and problem resolution is complete.

23. A system as in claim 22, further comprising an encrypted account information file containing global administrative account authentication information.

24. A system as in claim 22, wherein the encrypted account information file resides within a localized computer network.

25. A system as in claim 22, wherein the support program is configured to download and decrypt the encrypted account information file containing the global administrative account information in order to login to the global administrative account.

26. A system as in claim 22, wherein the support program is configured to remove the administrative rights from the client computer where web enabled support services were provided.

27. A system as in claim 22, wherein the administrative process can install an ActiveX component from the Internet.

28. A system as in claim 22, wherein the administrative process is a web browser.

29. A system for enabling a support program to provide services that use administrative rights on a client computer without administrative rights being granted to an end user of the client computer on a local computer network, comprising:
- a domain server means for communicating with the local computer network;
- a global administrative account means, including global administrative account access information in a strongly encrypted file, for providing administrative rights and configured to reside on the domain server;
- a support program means for directing administrative services on the client computer to perform trouble shooting and problem resolution on the client computer, the support program means being installed on the client computer from the Internet, the support program means enabled to download and decrypt the strongly encrypted file;
- an administrative process means created by the support program using the global administrative account, wherein the administrative process is configured for providing web enabled support services using administrative rights obtained from the global administrative account means to allow an end user, without administrative rights, to perform trouble shooting and problem resolution on the client computer; and wherein the system is configured to remove the process with administrative rights for the end user without administrative rights from the client computer where administrative services were provided once the trouble shooting and problem resolution is complete.

30. An article of manufacture, comprising:
a non-transitory computer usable medium having computer readable program code embodied therein for enabling a support program to provide services using administrative rights on a client computer for a user without administrative rights, the computer readable program code in the article of manufacture comprising:
- computer readable program code for creating a global administrative account on a domain server for a computer network, wherein the administrative rights of the client computer are managed by the global administrative account;
- computer readable program code for activating the support program on the client computer, wherein activating the support program includes activating a support program to perform trouble shooting and problem resolution on the client computer;
- computer readable program code for storing global administrative account access information in a strongly encrypted file;
- computer readable program code for enabling the support program to download and decrypt the strongly encrypted file;
- computer readable program code for creating a process with administrative rights via the support program using the global administrator account on the domain server, wherein the process allows the user without administrative rights to perform trouble shooting and problem resolution on the client computer;
- computer readable program code for enabling support services with administrative rights from the process for the user without administrative rights to perform troubleshooting and problem resolution on the client computer, wherein the support services are provided to the client computer; and
- computer readable program code for removing the process with administrative rights for the user without administrative rights from the client computer where administrative services were provided once the trouble shooting and problem resolution is complete.

* * * * *

UNITED STATES PATENT AND TRADEMARK OFFICE
CERTIFICATE OF CORRECTION

| | | |
|---|---|---|
| PATENT NO. | : 8,131,830 B2 | Page 1 of 1 |
| APPLICATION NO. | : 10/828078 | |
| DATED | : March 6, 2012 | |
| INVENTOR(S) | : Rajpal S. Gill et al. | |

It is certified that error appears in the above-identified patent and that said Letters Patent is hereby corrected as shown below:

In column 9, line 11, in Claim 2, after "method" delete "for".

In column 9, line 16, in Claim 3, delete "information." and insert -- information file. --, therefor.

Signed and Sealed this
Thirtieth Day of October, 2012

David J. Kappos
*Director of the United States Patent and Trademark Office*